US012231360B2

(12) United States Patent
Ren

(10) Patent No.: US 12,231,360 B2
(45) Date of Patent: Feb. 18, 2025

(54) SIGNAL COMMUNICATION METHOD AND DEVICE

(71) Applicant: DATANG MOBILE COMMUNICATIONS EQUIPMENT CO., LTD., Beijing (CN)

(72) Inventor: Bin Ren, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 408 days.

(21) Appl. No.: 17/640,206

(22) PCT Filed: Jul. 7, 2020

(86) PCT No.: PCT/CN2020/100733
§ 371 (c)(1),
(2) Date: Mar. 3, 2022

(87) PCT Pub. No.: WO2021/057175
PCT Pub. Date: Apr. 1, 2021

(65) Prior Publication Data
US 2022/0321293 A1    Oct. 6, 2022

(30) Foreign Application Priority Data
Sep. 29, 2019    (CN) .......................... 201910937193.6

(51) Int. Cl.
*H04L 5/00*    (2006.01)
*H04W 64/00*    (2009.01)
(Continued)

(52) U.S. Cl.
CPC ........... *H04L 5/0048* (2013.01); *H04W 64/00* (2013.01); *H04W 72/20* (2023.01)

(58) Field of Classification Search
None
See application file for complete search history.

(56) References Cited

U.S. PATENT DOCUMENTS 9,462,567 B2    10/2016  Johnsson et al.
9,713,117 B2    7/2017   Khoryaev et al.
(Continued)

FOREIGN PATENT DOCUMENTS

CN    104956703 A    9/2015
CN    106662634 A    5/2017
(Continued)

OTHER PUBLICATIONS

3GPP TSG RAN Meeting #79, "Motivation for new SI proposal on 5G V2X," RP-180384, Chennai, India, Mar. 19-22, 2018.

*Primary Examiner* — Hong Shao
(74) *Attorney, Agent, or Firm* — Meunier Carlin & Curfman LLC

(57) ABSTRACT

Disclosed are a signal transmission method and a device, the signal transmission method on a terminal side includes: sending, via a sidelink between a first terminal and a second terminal, a first sidelink positioning reference signal (SPRS) to the second terminal, and receiving a second SPRS sent by the second terminal; performing, on the basis of the second SPRS, a positioning measurement so as to obtain a first positioning measurement value; reporting the first positioning measurement value to a network side; and receiving a second positioning measurement value forwarded by the network side, wherein the second positioning measurement value is obtained by the second terminal performing a positioning measurement on the basis of the first SPRS.

10 Claims, 7 Drawing Sheets

(51) Int. Cl.
*H04W 72/04* (2023.01)
*H04W 72/20* (2023.01)

(56) References Cited

U.S. PATENT DOCUMENTS

| | | | |
|---|---|---|---|
| 2015/0312840 A1* | 10/2015 | Kazmi | H04W 64/00 |
| | | | 455/456.2 |
| 2016/0095092 A1 | 3/2016 | Khoryaev et al. | |
| 2018/0049196 A1 | 2/2018 | Gupta et al. | |
| 2019/0230618 A1 | 7/2019 | Saur et al. | |
| 2019/0239181 A1 | 8/2019 | Gangakhedkar et al. | |
| 2020/0408871 A1* | 12/2020 | Da | G01S 1/20 |

FOREIGN PATENT DOCUMENTS

| | | |
|---|---|---|
| CN | 106664518 A | 5/2017 |
| CN | 108562906 A | 9/2018 |
| CN | 108616492 A | 10/2018 |
| CN | 110062457 A | 7/2019 |
| WO | 2016048509 A1 | 3/2016 |

* cited by examiner

SIGNAL COMMUNICATION METHOD AND DEVICE

CROSS-REFERENCE OF RELATED APPLICATIONS

The disclosure is a US National Stage of International Application No. PCT/CN2020/100733, filed on Jul. 7, 2020, which claims priority to Chinese Patent Application No. 201910937193.6, filed with the China National Intellectual Property Administration on Sep. 29, 2019 and entitled "Signal Communication Method and Device", which is hereby incorporated by reference in its entirety.

FIELD

The disclosure relates to the field of communication technologies, and particularly to a signal communication method and device.

BACKGROUND

In the existing intelligent networked Vehicle-to-Everything (V2X) communication system of 5th Generation wireless systems (5G) New Radio (NR), a user terminal (V2X-UE, V-UE) using the intelligent networked V2X mainly obtains absolute position information through the positioning technology solution based on the Global Navigation Satellite System (GNSS). In addition, the V-UE may also measure a reference signal of a Sidelink to calculate relative position information to other V-UEs.

In the positioning technology solution introduced to the existing 5G NR radio interface (Uu) link, a terminal may obtain position information through the positioning technology solution based on downlink Observed Time Difference of Arrival (OTDOA) and Enhanced Cell ID (E-CID).

The OTDOA is a positioning method defined in 3GPP protocol specifications. The basic principle of the OTDOA is: a User Equipment (UE) measures downlink Positioning Reference Signals (PRSs) sent from a plurality of Transmission Points (TPs), which may also include Downlink Reference Signals (DL-RSs), to obtain measurement values of the Reference Signal Time Difference (RSTD) arriving at the UE, and reports them to a positioning server in the network to estimate a position of the UE. As shown in FIG. 1, the terminal calculates the position of the terminal by detecting time differences of arrived downlink signals from more than three different base stations. For high frequency bands, this positioning method combined with angle information may achieve higher positioning accuracy.

The E-CID positioning method is shown in FIG. 2. The terminal is located on a circle with the base station as the center and the Time Of Arrival (TOA) distance between the terminal and the base station as the radius. Then position information of the terminal may be obtained according to angle information of the Angle Of Arrival (AOA).

The physical channel and the signal format of the Sidelink defined in 5G NR are as follows.

Slot structure: there is Automatic Gain Control (AGC) at the beginning of a slot and a Guard Period (GP) at the end of the slot, where the AGC and GP generally use one Orthogonal Frequency Division Multiplexing (OFDM) symbol.

Synchronization: Subframe Synchronization and Block (SS/PBCH block, SSB) Synchronization are included.

In addition to the Physical Sidelink Shared Channel (PSSCH), Physical Sidelink Control Channel (PSCCH) and Physical Sidelink Broadcast Channel (PSBCH), the Physical Sidelink Feedback Channel (PSFCH) is added to physical channels.

In addition to the Sidelink-Primary Synchronization Signal (S-PSS)/Sidelink-Secondary Synchronization Signal (S-SSS) and Demodulation Reference Signal (DMRS), the Channel State Information-Reference Signal (CSI-RS) and Phase Tracking-Reference Signal (PT-RS) are added to physical signals.

However, the current positioning accuracy solely based on the 5G Sidelink condition is relatively low.

SUMMARY

Embodiments of the disclosure provide a signal communication method and device, to realize joint positioning of 5G Sidelink with 5G Uu link, and thus improve the positioning accuracy based on the 5G Sidelink.

On a terminal side, a signal communication method provided in an embodiment of the disclosure includes: sending a first Sidelink Positioning Reference Signal (SPRS) to a second terminal through a sidelink between a first terminal and the second terminal, and receiving a second SPRS sent by the second terminal; performing a positioning measurement based on the second SPRS to obtain a first positioning measurement value; reporting the first positioning measurement value to a network side; and receiving a second positioning measurement value forwarded by the network side, where the second positioning measurement value is obtained by the second terminal performing a positioning measurement based on the first SPRS.

In this method, the first SPRS is sent to the second terminal through the sidelink between the first terminal and the second terminal, and the second SPRS sent by the second terminal is received; the positioning measurement is performed based on the second SPRS to obtain the first positioning measurement value; the first positioning measurement value is reported to the network side; and the second positioning measurement value forwarded by the network side is received, where the second positioning measurement value is obtained by the second terminal performing the positioning measurement based on the first SPRS, thereby realizing joint positioning of 5G Sidelink with 5G Uu link, and thus also improving the positioning accuracy based on the 5G Sidelink.

Optionally, the method further includes: determining relative distance information from the second terminal to the first terminal according to the first positioning measurement value and the second positioning measurement value.

Optionally, the method further includes: sending a first Sounding Reference Signal (SRS) to a base station fort the base station to determine a positioning measurement value on a base station side according to the first SRS and a second SRS sent by the second terminal.

Optionally, the method further includes: receiving relative position information of the first terminal relative to the second terminal and absolute position information of the first terminal sent by a Location Management Function (LMF) entity.

Optionally, the method further includes: sending the first SPRS to a third terminal through a sidelink between the first terminal and the third terminal, and receiving a third SPRS sent by the third terminal; performing a positioning measurement based on the third SPRS to obtain another first positioning measurement value; reporting the another first positioning measurement value to the network side; and receiving a third positioning measurement value forwarded by the network side, where the third positioning measurement value is obtained by the third terminal performing a positioning measurement based on the first SPRS.

Optionally, the method further includes: determining relative distance information from the second terminal to the first terminal according to the first positioning measurement value and the second positioning measurement value; and determining relative distance information from the third terminal to the first terminal according to the another first positioning measurement value and the third positioning measurement value.

Optionally, a third positioning measurement value for a third terminal measured by the second terminal is also received when the second positioning measurement value is received; the method further includes: receiving a positioning measurement value for the second terminal measured by the third terminal and forwarded by a base station; determining relative distance information from the second terminal to the first terminal according to the first positioning measurement value and the second positioning measurement value; determining relative distance information from the third terminal to the second terminal according to the third positioning measurement value and the positioning measurement value for the second terminal measured by the third terminal; determining relative distance information from the first terminal to the third terminal according to the relative distance information from the second terminal to the first terminal and the relative distance information from the third terminal to the second terminal.

Optionally, resource configuration information of the first SPRS, second SPRS, third SPRS, first SRS and second SRS is obtained from a serving base station through signaling.

Optionally, the signaling is broadcast signaling, Downlink Control Information (DCI) signaling or positioning dedicated signaling of an air interface radio link, or positioning dedicated signaling of a sidelink.

On a base station side, a signal communication method provided in an embodiment of the disclosure includes: receiving and forwarding a first positioning measurement value sent by a first terminal; and receiving and forwarding a second positioning measurement value sent by a second terminal; where a sidelink is established between the first terminal and the second terminal.

Optionally, the first positioning measurement value is forwarded to the second terminal, and the second positioning measurement value is forwarded to the first terminal; or, the method further includes: receiving an SRS sent by the first terminal and the second terminal, and determining a positioning measurement value on a base station side by measuring the SRS; reporting the positioning measurement value on the base station side, the first positioning measurement value and the second positioning measurement value to an LMF entity.

Optionally, the first positioning measurement value is forwarded to the second terminal and a third terminal, and the second positioning measurement value is forwarded to the first terminal and the third terminal; where the first terminal establishes a sidelink with each of the third terminal and the second terminal, and no sidelink is established between the third terminal and the second terminal.

Optionally, the method further includes: receiving positioning measurement values respectively for the third terminal and the second terminal reported by the first terminal, and forwarding the positioning measurement values to the third terminal and the second terminal.

Optionally, the method further includes: sending resource configuration information of a first SPRS sent by the first terminal to the second terminal on a sidelink and resource configuration information of a second SPRS sent by the second terminal to the first terminal on the sidelink to the first terminal and the second terminal respectively through signaling.

Optionally, the signaling is broadcast signaling, DCI signaling or positioning dedicated signaling of an air interface radio link, or positioning dedicated signaling of a sidelink.

On a LMF side, a signal communication method provided in an embodiment of the disclosure includes: receiving a first positioning measurement value and a second positioning measurement value reported respectively by a first terminal and a second terminal that establishes a sidelink with the first terminal, and a positioning measurement value on a base station side reported by a base station; determining absolute position information of the first terminal and the second terminal and relative position information between the first terminal and the second terminal according to the first positioning measurement value, the second positioning measurement value, the positioning measurement value on the base station side and known base station position information; notifying the first terminal of absolute position information of the first terminal and relative position information of the first terminal relative to the second terminal; and notifying the second terminal of absolute position information of the second terminal and relative position information of the second terminal relative to the first terminal.

Optionally, the method further includes: sending resource configuration information of a first SRS and resource configuration information of a second SRS to the first terminal and the second terminal respectively through signaling.

Optionally, the signaling is broadcast signaling, DCI signaling or positioning dedicated signaling of an air interface radio link, or positioning dedicated signaling of a sidelink.

On the terminal side, a signal communication device provided in an embodiment of the disclosure includes: a memory configured to store program instructions; a processor configured to invoke the program instructions stored in the memory, and execute according to an obtained program: sending a first SPRS to a second terminal through a sidelink between a first terminal and the second terminal, and receiving a second SPRS sent by the second terminal; performing a positioning measurement based on the second SPRS to obtain a first positioning measurement value; reporting the first positioning measurement value to a network side; and receiving a second positioning measurement value forwarded by the network side, where the second positioning measurement value is obtained by the second terminal performing a positioning measurement based on the first SPRS.

Optionally, the processor is further configured to: determine relative distance information from the second terminal to the first terminal according to the first positioning measurement value and the second positioning measurement value.

Optionally, the processor is further configured to: send a first SRS to a base station for the base station to determine a positioning measurement value on a base station side according to the first SRS and a second SRS sent by the second terminal.

Optionally, the processor is further configured to: receive relative position information of the first terminal relative to the second terminal and absolute position information of the first terminal sent by an LMF entity.

Optionally, the processor is further configured to: send the first SPRS to a third terminal through a sidelink between the first terminal and the third terminal, and receive a third SPRS sent by the third terminal; perform a positioning measurement based on the third SPRS to obtain another first positioning measurement value; report the another first positioning measurement value to the network side; and receive a third positioning measurement value forwarded by the network side, where the third positioning measurement value is obtained by the third terminal performing a positioning measurement based on the first SPRS.

Optionally, the processor is further configured to: determine relative distance information from the second terminal to the first terminal according to the first positioning measurement value and the second positioning measurement value; and determine relative distance information from the third terminal to the first terminal according to the another first positioning measurement value and the third positioning measurement value.

Optionally, the processor also receives a third positioning measurement value for a third terminal measured by the second terminal when receiving the second positioning measurement value; the processor is further configured to: receive a positioning measurement value for the second terminal measured by the third terminal and forwarded by a base station; determine relative distance information from the second terminal to the first terminal according to the first positioning measurement value and the second positioning measurement value; determine relative distance information from the third terminal to the second terminal according to the third positioning measurement value and the positioning measurement value for the second terminal measured by the third terminal; determine relative distance information from the first terminal to the third terminal according to the relative distance information from the second terminal to the first terminal and the relative distance information from the third terminal to the second terminal.

Optionally, the processor obtains resource configuration information of the first SPRS, second SPRS, third SPRS, first SRS and second SRS from a serving base station through signaling.

Optionally, the signaling is broadcast signaling, DCI signaling or positioning dedicated signaling of an air interface radio link, or positioning dedicated signaling of a sidelink.

On the base station side, a signal communication device provided in an embodiment of the disclosure includes: a memory configured to store program instructions; a processor configured to invoke the program instructions stored in the memory, and execute according to an obtained program: receiving and forwarding a first positioning measurement value sent by a first terminal; and receiving and forwarding a second positioning measurement value sent by a second terminal; where a sidelink is established between the first terminal and the second terminal.

Optionally, the processor forwards the first positioning measurement value to the second terminal, and forwards the second positioning measurement value to the first terminal; or, the processor is further configured to: receive an SRS sent by the first terminal and the second terminal, and determine a positioning measurement value on a base station side by measuring the SRS; the processor forwards the positioning measurement value on the base station side, the first positioning measurement value and the second positioning measurement value to an LMF entity.

Optionally, the processor forwards the first positioning measurement value to the second terminal and a third terminal, and forwards the second positioning measurement value to the first terminal and the third terminal; where the first terminal establishes a sidelink with each of the third terminal and the second terminal, and no sidelink is established between the third terminal and the second terminal.

Optionally, the processor is further configured to: receive positioning measurement values respectively for the third terminal and the second terminal reported by the first terminal, and forward the positioning measurement values to the third terminal and the second terminal.

Optionally, the processor is further configured to: send resource configuration information of a first SPRS sent by the first terminal to the second terminal on a sidelink and resource configuration information of a second SPRS sent by the second terminal to the first terminal on the sidelink to the first terminal and the second terminal respectively through signaling.

Optionally, the signaling is broadcast signaling, DCI signaling or positioning dedicated signaling of an air interface radio link, or positioning dedicated signaling of a sidelink.

On the LMF entity side, a signal communication device provided in an embodiment of the disclosure includes: a memory configured to store program instructions; a processor configured to invoke the program instructions stored in the memory, and execute according to an obtained program: receiving a first positioning measurement value and a second positioning measurement value reported respectively by a first terminal and a second terminal that establishes a sidelink with the first terminal, and a positioning measurement value on a base station side reported by a base station; determining absolute position information of the first terminal and the second terminal and relative position information between the first terminal and the second terminal according to the first positioning measurement value, the second positioning measurement value, the positioning measurement value on the base station side and known base station position information; notifying the first terminal of absolute position information of the first terminal and relative position information of the first terminal relative to the second terminal; and notifying the second terminal of absolute position information of the second terminal and relative position information of the second terminal relative to the first terminal.

Optionally, the processor is further configured to: send resource configuration information of a first SRS and resource configuration information of a second SRS to the first terminal and the second terminal respectively through signaling.

Optionally, the signaling is broadcast signaling, DCI signaling or positioning dedicated signaling of an air interface radio link, or positioning dedicated signaling of a sidelink.

On the terminal side, another signal communication device provided in an embodiment of the disclosure includes: a first unit configured to send a first SPRS to a second terminal through a sidelink between a first terminal and the second terminal, and receive a second SPRS sent by the second terminal; a second unit configured to perform a positioning measurement based on the second SPRS to obtain a first positioning measurement value; a third unit configured to report the first positioning measurement value to a network side; and receive a second positioning measurement value forwarded by the network side, where the second positioning measurement value is obtained by the second terminal performing a positioning measurement based on the first SPRS.

On the base station side, another signal communication device provided in an embodiment of the disclosure includes: a first forwarding unit configured to receive and forward a first positioning measurement value sent by a first terminal; and a second forwarding unit configured to receive and forward a second positioning measurement value sent by a second terminal; where a sidelink is established between the first terminal and the second terminal.

On the LMF side, another signal communication device provided in an embodiment of the disclosure includes: a receiving unit configured to receive a first positioning measurement value and a second positioning measurement value reported respectively by a first terminal and a second terminal that establishes a sidelink with the first terminal, and a positioning measurement value on a base station side reported by a base station; a determining unit configured to determine absolute position information of the first terminal and the second terminal and relative position information between the first terminal and the second terminal according to the first positioning measurement value, the second positioning measurement value, the positioning measurement value on the base station side and known base station position information; a sending unit configured to notify the first terminal of absolute position information of the first terminal and relative position information of the first terminal relative to the second terminal; and notify the second terminal of absolute position information of the second terminal and relative position information of the second terminal relative to the first terminal.

Another embodiment of the disclosure provides a computer storage medium storing computer executable instructions configured to cause a computer to perform any one of the above-mentioned methods.

BRIEF DESCRIPTION OF THE DRAWINGS

In order to illustrate technical solutions in embodiments of the disclosure more clearly, accompanying drawings which need to be used in describing embodiments will be introduced below briefly. Obviously the accompanying drawings described below are only some embodiments of the disclosure, and other accompanying drawings can also be obtained by those ordinary skilled in the art according to these accompanying drawings without creative work.

DETAILED DESCRIPTION OF EMBODIMENTS

Figure 1:
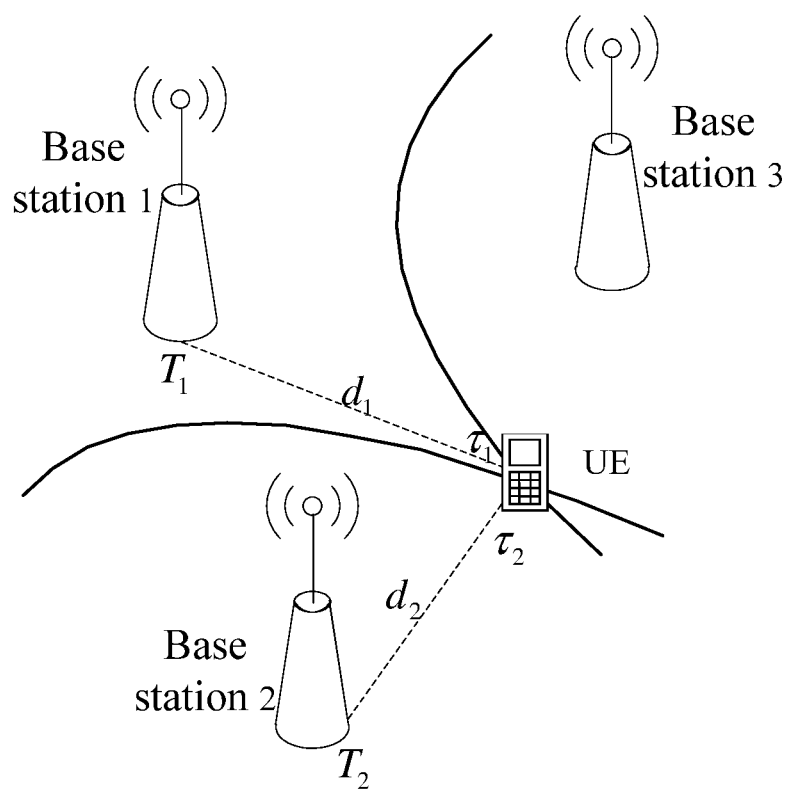
FIG. 1 is a schematic diagram of OTDOA positioning.
Figure 2:
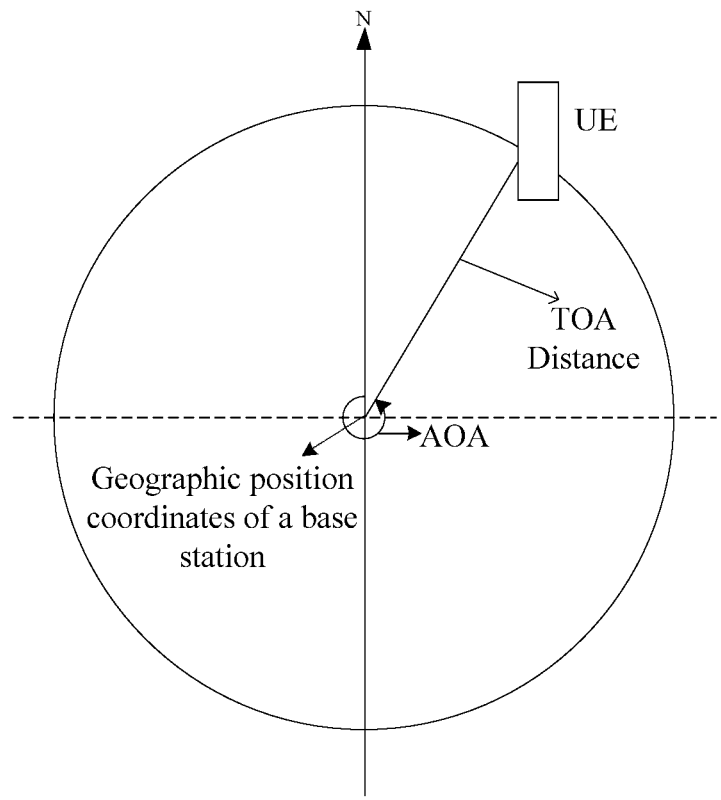
FIG. 2 is a schematic diagram of E-CID positioning.

Technical solutions in embodiments of the disclosure will be described clearly and completely below in combination with the accompanying drawings in embodiments of the disclosure. Obviously the described embodiments are only a part of embodiments of the disclosure but not all embodiments. Based upon embodiments in the disclosure, all of other embodiments obtained by those ordinary skilled in the art without creative work pertain to the protection scope of the disclosure.

Embodiments of the disclosure provide a signal communication method and device, to realize joint positioning of 5G Sidelink with 5G Uu link, and thus improve the positioning accuracy based on the 5G Sidelink.

Here, the method and apparatus are based on the same application concept. Since the principle of solving the problem in the method is similar to that in the device, the implementations of the device and method may refer to each other, and the repeated description thereof will be omitted.

Technical solutions provided by embodiments of the disclosure may be applicable to various systems, especially 5G systems. For example, the applicable systems may include: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide interoperability for Microwave Access (WiMAX) system, 5G system and 5G NR system, etc. These systems all include terminal devices and network devices.

The terminal device involved in embodiments of the disclosure may be a device for providing voice and/or data connectivity to the user, a handheld device with the wireless connection function, or other processing device connected to the wireless modem. In different systems, the terminal device may have different names For example, in a 5G system, the terminal device may be referred to as User Equipment (UE). The wireless terminal device may communicate with one or more core networks via the Radio Access Network (RAN), and the wireless terminal device may be a mobile terminal, such as a mobile telephone (or called "cellular" telephone), and a computer with the mobile terminal, for example, may be a portable, pocket, handheld, computer built-in or vehicle-carried mobile device, and the mobile devices exchange the voice and/or data with the radio access network. For example, the wireless terminal device may be a Personal Communication Service (PCS) telephone, a cordless telephone, a Session Initiation Protocol (SIP) telephone, a Wireless Local Loop (WLL) station, a Personal Digital Assistant (PDA) and other devices. The wireless terminal device may also be called as a system, a subscriber unit, a subscriber station, a mobile station, a mobile, a remote station, an access point, a remote terminal, an access terminal, a user terminal, a user agent, a user device, which is not limited in embodiments of the disclosure.

The network device involved in embodiments of the disclosure may be a base station including a plurality of cells. Depending on specific application scenarios, the base station may also be called as an access point, or may refer to the device in the access network communicating with the wireless terminal via one or more sectors over the air interface, or other names. The network device may be used to perform the inter-conversion between the received air frame and Internet Protocol (IP) packet, and used as the router between the wireless terminal device and the rest of the access network, where the rest of the access network may include IP networks. The network device may further coordinate attribute management of the air interface. For example, the network device involved in embodiments of the disclosure may be a network device (Base Transceiver Station (BTS)) in the GSM system or CDMA system, or may be a network device (NodeB) in the WCDMA system, or may be an evolutional network device (evolutional Node B (eNB or e-NodeB)) in the LTE system, a 5G base station in the 5G network architecture (next generation system), or may be a Home evolved Node B (HeNB), a relay node, femto, pico, etc., which is not limited in embodiments of the disclosure.

Embodiments of the disclosure will be described below in detail with reference to the drawings of the specification. It should be noted that the showing order of embodiments of the disclosure only represents the sequential order of embodiments, but does not represent the pros and cons of the technical solutions provided by embodiments.

The technical solutions provided in embodiments of the disclosure include following contents.

(1) A joint positioning method of 5G Sidelink combined with 5G Uu link is proposed.

(2) Based on (1), a forwarding method based on positioning measurement values of Uu link is proposed.

First case (CASE 1): a scenario of two V-UEs+one Base Station (BS) is illustrated.

Figure 3:
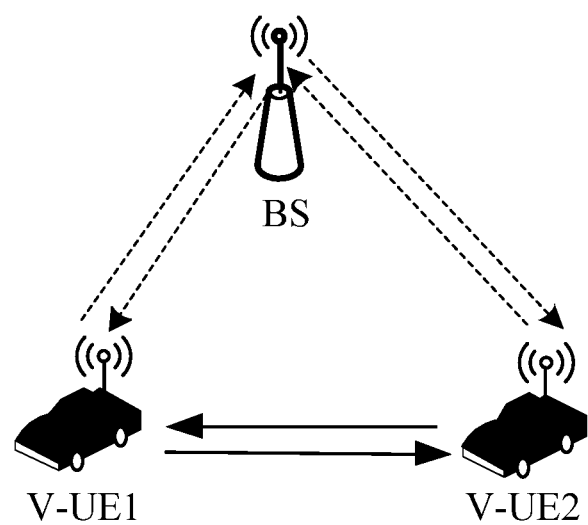
FIG. 3 is a schematic diagram of a scenario of two V-UEs and one BS according to an embodiment of the disclosure.

As shown in FIG. 3, the CASE 1 includes two V-UEs (for example, called as V-UE1 and V-UE2, respectively) and one serving BS, where the BS may communicate with two V-UEs through 5G Uu link, and the V-UE1 and V-UE2 may transmit signals directly through 5G Sidelink. The V-UE1 and V-UE2 may also be referred to as a first terminal and a second terminal, respectively.

The signal communication method performed at the V-UE1 includes following steps.

Step 1: obtaining resource configuration information of a 5G Sidelink PRS1 (called as SPRS1) to be sent by the V-UE1 and an SPRS2 to be received by the V-UE1 (that is, the SPRS sent by the V-UE2) from a serving base station through signaling, where the signaling may be broadcast signaling, DCI signaling or positioning dedicated signaling of an air interface radio link Uu, or positioning dedicated signaling of a sidelink based on PC5 protocol.

Step 2: the V-UE1 sends an SPRS1 signal to the V-UE2 in Slot n.

Step 3: the V-UE1 receives an SPRS2 signal sent by the V-UE2, performs a measurement and obtains a positioning measurement value 1 (also called as a first positioning measurement value) in Slot m.

Here, the positioning measurement value 1 includes but is not limited to Received Signal Strength (RSS), TOA, AOA, etc.

Step 4: the V-UE1 reports the above positioning measurement value 1 to the network through the Uu link.

Step 5: the V-UE1 receives a positioning measurement value 2 (also called as a second positioning measurement value) for the V-UE1 measured by the V-UE2 and forwarded by the BS through the Uu link.

Step 6: the V-UE1 jointly calculates relative distance information from the V-UE2 to the V-UE1 according to the positioning measurement value 1 calculated by the V-UE1 and the positioning measurement value 2 forwarded by the BS.

Here, the SPRS2 and SPRS1 may be configured in the same slot or in different slots. For the current V-UE working in the half-duplex mode, the SPRS2 and SPRS1 are in different slots, and optionally, the SPRS2 and SPRS1 may be configured in adjacent slots.

Correspondingly, the signal communication method performed at the V-UE2 includes following steps.

Step 1: obtaining resource configuration information of a 5G SPRS2 to be sent by the V-UE2 and an SPRS1 to be received by the V-UE2 from a serving base station through signaling, where the signaling may be broadcast signaling, DCI signaling or positioning dedicated signaling of an air interface radio link Uu, or positioning dedicated signaling of a sidelink based on PC5 protocol.

Step 2: the V-UE2 sends an SPRS2 signal to the V-UE1 in Slot m.

Step 3: the V-UE2 receives an SPRS1 signal sent by the V-UE1, performs a measurement and obtains a positioning measurement value 2 in Slot n, where the positioning measurement value 2 includes but is not limited to RSS, TOA, AOA, etc.

Step 4: the V-UE2 reports the above positioning measurement value 2 to the network through the Uu link.

Step 5: the V-UE2 receives a positioning measurement value 1 for the V-UE2 measured by the V-UE1 and forwarded by the BS through the Uu link.

Step 6: the V-UE2 jointly calculates relative distance information from the V-UE1 to the V-UE2 according to the positioning measurement value 2 calculated by the V-UE2 and the positioning measurement value 1 forwarded by the BS.

The signal communication method performed on the serving BS side includes following steps.

Step 1: the BS sends resource configuration information of the SPRS1 and the resource configuration information of the SPRS2 to the V-UE1 and V-UE2 respectively through signaling, where the signaling may be broadcast signaling, DCI signaling or positioning dedicated signaling of an air interface radio link Uu, or positioning dedicated signaling of a sidelink based on PC5 protocol.

Step 2: the BS receives the positioning measurement value 1 reported by the V-UE1 through the Uu link, and forwards the positioning measurement value 1 to the V-UE2.

Step 3: the BS receives the positioning measurement value 2 reported by the V-UE2 through the Uu link, and forwards the positioning measurement value 2 to the V-UE1.

Second case (CASE2): a scenario of two V-UEs+one BS+LMF is illustrated.

Figure 4:
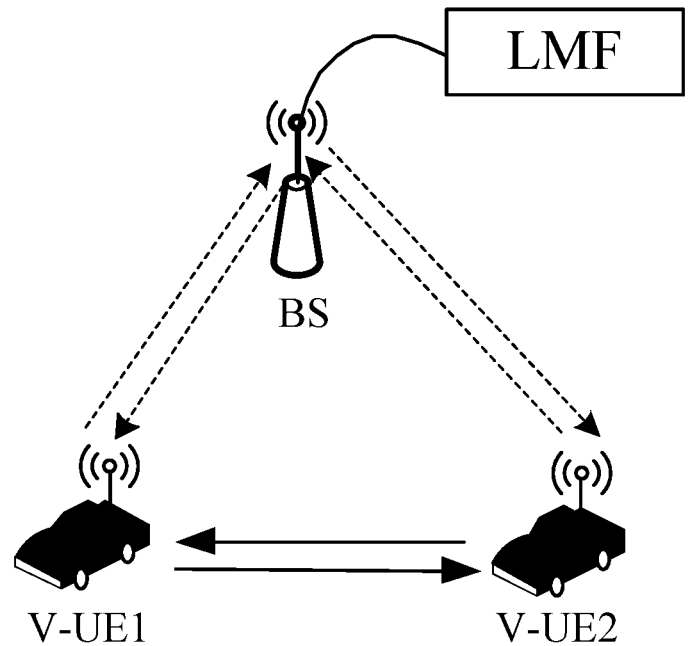
FIG. 4 is a schematic diagram of a scenario of two V-UEs, one BS and one LMF entity according to an embodiment of the disclosure.

As shown in FIG. 4, the CASE 2 includes two V-UEs (V-UE1 and V-UE2 respectively), one serving BS and an LMF entity, where the BS may communicate with two V-UEs through 5G Uu link, the V-UE1 and V-UE2 may transmit signals directly through 5G Sidelink, and the LMF is used for positioning calculation (absolute position or relative position).

The V-UE1 and V-UE2 measure their respective positioning measurement value 1 and positioning measurement value 2 such as TOA, AOA and carrier phase respectively through the Sidelink, and then report the positioning measurement value 1 and the positioning measurement value 2 respectively to the network-side LMF through the Uu link.

The V-UE1 and V-UE2 send uplink Sounding Reference Signals (SRSs) to the base station respectively through the Uu link, for the base station to perform measurements to obtain positioning measurement values such as TOA and AoA on the base station side.

The base station reports the positioning measurement values on the base station side to the LMF, the LMF jointly calculates absolute positions of the V-UE1 and V-UE2 and a relative position of the V-UE1 and V-UE2 based on the E-CID positioning scheme in combination with the positioning measurement values on the base station side and the positioning measurement value 1 and the positioning measurement value 2 reported by the V-UE1 and V-UE2 respectively and obtained through the Sidelink, and then LMF notifies the V-UE1 and V-UE2 of the above position information respectively.

The signal communication method performed on the V-UE1 side includes following steps.

Step 1: obtaining the resource configuration information of a 5G Sidelink PRS1 (SPRS1) and a first SRS to be sent by the V-UE1 and an SPRS2 to be received by the V-UE1 from a serving base station through signaling, where the signaling may be broadcast signaling, DCI signaling or positioning dedicated signaling of an air interface radio link Uu, or positioning dedicated signaling of a sidelink based on PC5 protocol.

Step 2: the V-UE1 sends the SPRS1 signal to the V-UE2 in Slot n.

Step 3: the V-UE1 receives the SPRS2 signal sent by the V-UE2, performs a measurement and obtains a positioning measurement value 1 in Slot m, where the positioning measurement value 1 includes but is not limited to RSS, TOA, AOA, etc.

Step 4: the V-UE1 reports the above positioning measurement value 1 to the network through the Uu link.

Step 5: the V-UE1 sends a first SRS (which may be expressed as SRS1) signal to the BS through the Uu link.

Step 6: the V-UE1 receives relative position information of the V-UE1 relative to the V-UE2 and absolute position information of the V-UE1 notified by the LMF through the Uu link.

Here, the SPRS2 and SPRS1 may be configured in the same slot or in different slots. For the current V-UE working in the half-duplex mode, the SPRS2 and SPRS1 are in different slots, and optionally, the SPRS2 and SPRS1 may be configured in two adjacent slots.

The signal communication method performed on the V-UE2 side includes following steps.

Step 1: obtaining the resource configuration information of a 5G Sidelink PRS2 (denoted as SPRS2) and a second SRS to be sent by the V-UE2 and an SPRS1 to be received by the V-UE2 from a serving base station through signaling, where the signaling may be broadcast signaling, DCI signaling or positioning dedicated signaling of an air interface radio link Uu, or positioning dedicated signaling of a sidelink based on PC5 protocol.

Step 2: the V-UE2 sends the SPRS2 signal to the V-UE1 in Slot m.

Step 3: the V-UE2 receives the SPRS1 signal sent by the V-UE1, performs a measurement and obtains a positioning measurement value 2 in Slot n, where the positioning measurement value 2 includes but is not limited to RSS, TOA, AOA, etc.

Step 4: the V-UE2 reports the above positioning measurement value 2 to the network through the Uu link.

Step 5: the V-UE2 sends the second SRS (denoted as SRS2) signal to the BS through the Uu link.

Step 6: the V-UE2 receives the relative position information of the V-UE2 relative to the V-UE1 and the absolute position information of the V-UE2 notified by the LMF through the Uu link.

The signal communication method performed on the serving BS side includes following steps.

Step 1: the BS sends the resource configuration information of the SPRS 1 and the resource configuration information of the SPRS2 to the V-UE1 and V-UE2 respectively through signaling, where the signaling may be broadcast signaling, DCI signaling or positioning dedicated signaling of an air interface radio link Uu, or positioning dedicated signaling of a sidelink based on PC5 protocol.

Step 2: the BS receives the positioning measurement value 1 reported by the V-UE1 through the Uu link, and forwards the positioning measurement value 1 to the LMF.

Step 3: the BS receives the positioning measurement value 2 reported by the V-UE2 through the Uu link, and forwards the positioning measurement value 2 to the LMF.

Step 4: the BS receives and measures the first SRS (denoted as SRS 1) signal sent by the V-UE1 through the Uu link, to obtain a positioning measurement value based on SRS1 on the BS side.

Step 5: the BS receives and measures the second SRS (denoted as SRS2) signal sent by the V-UE2 through the Uu link, to obtain a positioning measurement value based on SRS2 on the BS side.

The signal communication method performed on the positioning server LMF side includes following steps.

Step 1: the LMF sends resource configuration information of the SRSs to the V-UE1 and V-UE2 respectively through the Uu link and NR Positioning Protocol A (NRPPa) protocol.

Step 2: the LMF receives the positioning measurement values based on SRS1 and SRS2 on the BS side reported by the BS, and the positioning measurement value 1 and positioning measurement value 2 reported by the V-UE1 and V-UE2 respectively and obtained based on the Sidelink.

Step 3: the LMF jointly calculates the absolute positions of the V-UE1 and V-UE2 and the relative position of the V-UE1 and V-UE2 by using the E-CID positioning technical scheme based on the above-mentioned positioning measurement value 1, positioning measurement value 2 and positioning measurement values on the BS side and known base station position information.

A method of calculating the relative position of the V-UE1 and V-UE2 is illustrated by example below. Assuming that both the positioning measurement values 1 and 2 are TOAs, TOA_mean=(TOA1+TOA2)/2 is obtained by averaging based on the positioning measurement value TOA1 and the positioning measurement value TOA2, and then the relative position d of the V-UE1 and V-UE2 is calculated based on d=c*TOA_mean, where c represents the speed of light.

A method of calculating the absolute positions of the V-UE1 and V-UE2 is illustrated by example below. Assuming that the positioning measurement values on the BS side are TOA and AOA based on SRS1 and SRS2 respectively, the absolute position of the V-UE1 and the absolute position of the V-UE2 may be calculated using the E-CID positioning technology (i.e., TOA+AOA joint positioning) scheme. Further, the absolute position of the V-UE1 and the absolute position of the V-UE2 may be corrected based on the above relative position of the V-UE1 and V-UE2.

Step 4: the LMF informs the V-UE1 and V-UE2 of the above position information through the Uu link and NR positioning protocol NRPPa respectively.

Third case (CASE3): a scenario of three V-UEs+one BS is illustrated.

Figure 5:
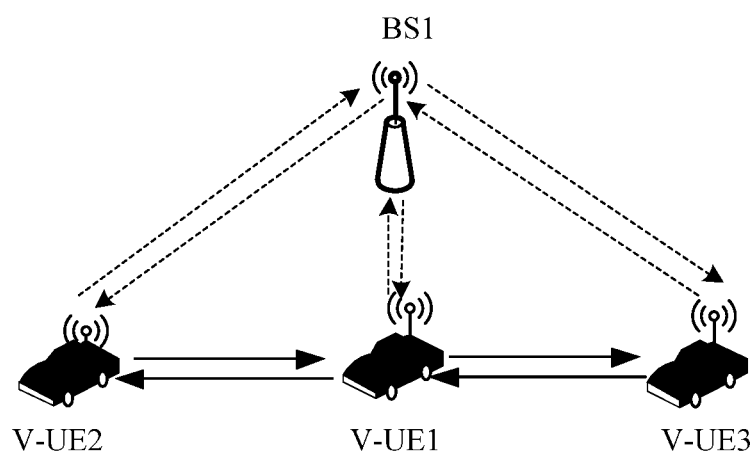
FIG. 5 is a schematic diagram of a scenario of three V-UEs and one BS according to an embodiment of the disclosure.

As shown in FIG. 5, the CASE 3 includes three V-UEs (numbered as V-UE1, V-UE2 and V-UE3) and one serving base station BS, where the V-UE1, V-UE2 and V-UE3 are located on the same straight path. The BS may communicate with two V-UEs through 5G Uu link, and the V-UE1 and V-UE2 may transmit signals directly through 5G Sidelink; the V-UE1 and V-UE3 may transmit signals directly through 5G Sidelink; and signals cannot be transmitted between the V-UE2 and V-UE3 directly through 5G Sidelink.

The signal communication method performed on the V-UE1 side includes following steps.

Step 1: obtaining the resource configuration information of a 5G Sidelink PRS1 (SPRS1) to be sent by the V-UE1 and an SPRS2 and an SRPS3 to be received by the V-UE1 from a serving base station through signaling, where the signaling may be broadcast signaling, DCI signaling or positioning dedicated signaling of an air interface radio link Uu, or positioning dedicated signaling of a sidelink based on PC5 protocol.

Step 2: the V-UE1 sends the SPRS1 signal to the V-UE2 and V-UE3 at the same time in Slot n.

Step 3: the V-UE1 receives the SPRS2 signal sent by the V-UE2, performs a measurement and obtains a positioning measurement value Measure_21 in Slot m, where the positioning measurement value Measure_21 includes but is not limited to Received Signal Strength (RSS), Time Of Arrival (TOA), Angle Of Arrival (AOA), Carrier Phase (CP), etc.

Step 4: the V-UE1 receives the SPRS3 signal sent by the V-UE3, performs a measurement and obtains a positioning measurement value Measure_31 in Slot p, where the positioning measurement value Measure_31 includes but is not limited to RSS, TOA, AOA, CP, etc.

Step 5: the V-UE1 reports the above positioning measurement values Measure_21 and Measure_31 to the network through the Uu link.

Step 6: the V-UE1 receives a positioning measurement value Measure_12 for the V-UE1 measured by the V-UE2 and a positioning measurement value Measure_13 for the V-UE1 measured by the V-UE3 that are forwarded by the BS through the Uu link.

Step 7: the V-UE1 jointly calculates the relative distance information d21 from the V-UE2 to the V-UE1 according to the positioning measurement value Measure_21 calculated by the V-UE1 and the positioning measurement value Measure_12 forwarded by the BS.

Step 8: the V-UE1 jointly calculates the relative distance information d31 from the V-UE3 to the V-UE1 according to the positioning measurement value Measure_31 calculated by the V-UE1 and the positioning measurement value Measure_13 forwarded by the BS.

Here, the SPRS1, SPRS2 and SPRS3 may be configured in the same slot or in different slots. For the current V-UE working in the half-duplex mode, the SPRS1, SPRS2 and SPRS3 are in different slots, and optionally, the SPRS1, SPRS2 and SPRS3 may be configured in adjacent slots.

The signal communication method performed on the V-UE2 side includes following steps.

Step 1: obtaining the resource configuration information of an SPRS2 to be sent by the V-UE2 and an SPRS1 to be received by the V-UE2 from a serving base station through signaling, where the signaling may be broadcast signaling, DCI signaling or positioning dedicated signaling of an air interface radio link Uu, or positioning dedicated signaling of a sidelink based on PC5 protocol.

Step 2: the V-UE2 sends the SPRS2 signal to the V-UE1 in Slot m.

Step 3: the V-UE2 receives the SPRS1 signal sent by the V-UE1, performs a measurement and obtains a positioning measurement value Measure_12 in Slot n, where the positioning measurement value Measure_12 includes but is not limited to RSS, TOA, AOA, CP, etc.

Step 4: the V-UE2 reports the above positioning measurement value Measure_12 to the network through the Uu link.

Step 5: the V-UE2 receives a positioning measurement value Measure_21 of the V-UE1 for the V-UE2 and a positioning measurement value Measure_31 of the V-UE1 for the V-UE3 that are measured by the V-UE1 and forwarded by the BS through the Uu link, and receives a positioning measurement value Measure_13 of the V-UE3 for the V-UE1 measured by the V-UE3 and forwarded by the BS through the Uu link.

Step 6: the V-UE2 jointly calculates the relative distance information d21 from the V-UE1 to the V-UE2 according to the positioning measurement value Measure_12 calculated by the V-UE2 and the positioning measurement value Measure_21 forwarded by the BS.

The V-UE2 jointly calculates the relative distance information d31 from the V-UE3 to the V-UE1 according to the positioning measurement value Measure_31 of the V-UE1 for the V-UE3 and the positioning measurement value Measure_13 of the V-UE3 for the V-UE1 forwarded by the BS.

According to the above information d21 and d31, the relative distance information from the V-UE2 to the V-UE3 is jointly calculated as d23=d21+d31.

The signal communication method performed on the V-UE3 side includes following steps.

Step 1: obtaining the resource configuration information of an SPRS3 to be sent by the V-UE3 and an SPRS1 to be received by the V-UE3 from a serving base station through signaling, where the signaling may be broadcast signaling, DCI signaling or positioning dedicated signaling of an air interface radio link Uu, or positioning dedicated signaling of a sidelink based on PC5 protocol.

Step 2: the V-UE3 sends the SPRS3 signal to the V-UE1 in Slot p.

Step 3: the V-UE3 receives the SPRS1 signal sent by the V-UE1, performs a measurement and obtains a positioning measurement value Measure_13 in Slot n, where the positioning measurement value Measure_13 includes but is not limited to RSS, TOA, AOA, etc.

Step 4: the V-UE3 reports the above positioning measurement value Measure_13 to the network through the Uu link.

Step 5: the V-UE3 receives a positioning measurement value Measure_21 for the V-UE2 and a positioning measurement value Measure_31 for the V-UE3 that are measured by the V-UE1 and forwarded by the BS through the Uu link.

Step 6: the V-UE3 jointly calculates the relative distance information d31 from the V-UE1 to the V-UE3 according to the positioning measurement value Measure_13 calculated by the V-UE3 and the positioning measurement values Measure_21 and Measure_31 forwarded by the BS.

The V-UE3 jointly calculates the relative distance information d21 from the V-UE2 to the V-UE1 according to the positioning measurement value Measure_21 of the V-UE1 for the V-UE2 and the positioning measurement value Measure_12 of the V-UE2 for the V-UE1 forwarded by the BS.

According to the above information d21 and d31, the relative distance information from the V-UE2 to the V-UE3 is jointly calculated as d23=d21+d31.

The signal communication method performed on the serving BS side includes following steps.

Step 1: the BS sends the resource configuration information of the SPRS1, SPRS2 and SPRS3 to the V-UE1, V-UE2 and V-UE3 respectively through signaling, where the signaling may be broadcast signaling, DCI signaling or positioning dedicated signaling of an air interface radio link Uu, or positioning dedicated signaling of a sidelink based on PC5 protocol.

Step 2: the BS receives the positioning measurement values Measure_21 and Measure_31 and the relative distance information d21 and d31 reported by the V-UE1 through the Uu link, and forwards the information to the V-UE2 and V-UE3.

Step 3: the BS receives the positioning measurement value Measure_12 reported by the V-UE2 through the Uu link, and forwards the positioning measurement value Measure_12 to the V-UE1 and V-UE3.

Step 4: the BS receives the positioning measurement value Measure_13 reported by the V-UE3 through the Uu link, and forwards the positioning measurement value Measure_13 to the V-UE1 and V-UE2.

In summary, embodiments of the disclosure propose a joint positioning method of 5G Sidelink combined with 5G Uu link. Compared with the existing technical solution, the positioning accuracy based on the 5G Sidelink condition is improved.

Figure 6:
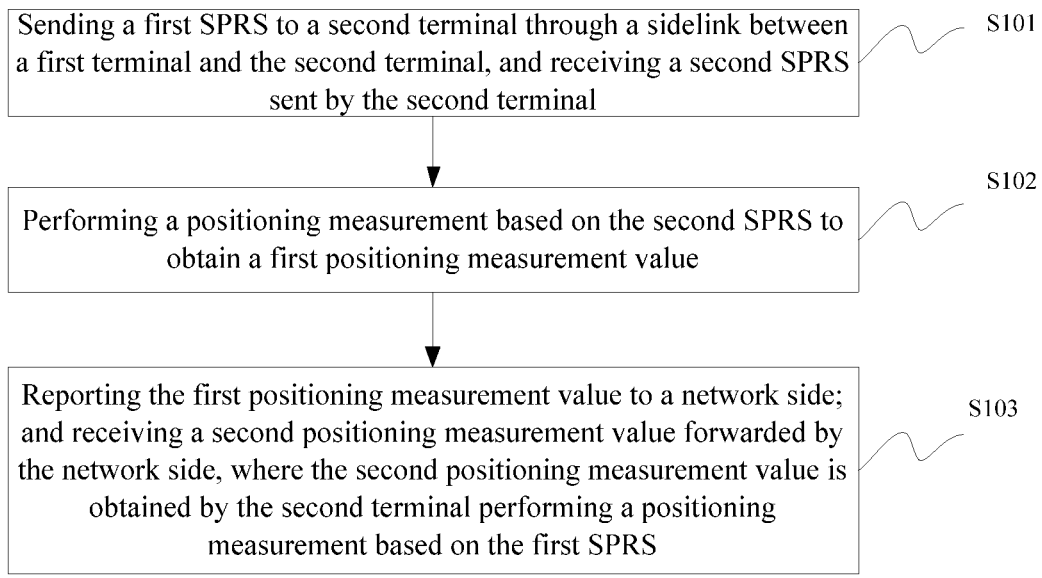
FIG. 6 is a schematic flowchart of a signal communication method on the terminal side according to an embodiment of the disclosure.

Referring to FIG. 6, on any terminal side, a signal communication method provided in an embodiment of the disclosure includes following steps.

S101: sending a first SPRS to a second terminal through a sidelink between a first terminal and the second terminal, and receiving a second SPRS sent by the second terminal.

S102: performing a positioning measurement based on the second SPRS to obtain a first positioning measurement value.

S103: reporting the first positioning measurement value to a network side; and receiving a second positioning measurement value forwarded by the network side, where the second positioning measurement value is obtained by the second terminal performing a positioning measurement based on the first SPRS.

Optionally, corresponding to the above CASE1, the method further includes: determining relative distance information from the second terminal to the first terminal according to the first positioning measurement value and the second positioning measurement value.

For CASE1, the first terminal may be understood as V-UE1, the second terminal may be understood as V-UE2, the first positioning measurement value may be understood as the positioning measurement value 1, and the second positioning measurement value may be understood as the positioning measurement value 2.

Optionally, corresponding to the above CASE2, the method further includes: sending a first SRS to a base station for the base station to determine a positioning measurement value on a base station side according to the first SRS and a second SRS sent by the second terminal.

For CASE2, the first terminal may be understood as V-UE1, the second terminal may be understood as V-UE2, the first positioning measurement value may be understood as the positioning measurement value 1, and the second positioning measurement value may be understood as the positioning measurement value 2.

Optionally, for CASE2, the method further includes: receiving relative position information of the first terminal relative to the second terminal and absolute position information of the first terminal sent by an LMF entity.

Corresponding to the UE1 in CASE3, the method further includes: sending the first SPRS to a third terminal through a sidelink between the first terminal and the third terminal, and receiving a third SPRS sent by the third terminal; performing a positioning measurement based on the third SPRS to obtain another first positioning measurement value (for example, corresponding to CASE3, the first positioning measurement value is Measure_21, and the another first positioning measurement value is Measure_31); reporting the another first positioning measurement value to the network side; and receiving a third positioning measurement value forwarded by the network side (at this time, the third positioning measurement value is for example Measure_13 described in CASE3, and the second positioning measurement value is for example Measure_12 described in CASE3), where the third positioning measurement value is obtained by the third terminal performing a positioning measurement based on the first SPRS.

Optionally, corresponding to the UE1 in CASE3, the method further includes: determining the relative distance information (d21) from the second terminal to the first terminal according to the first positioning measurement value (Measure_21) and the second positioning measurement value (Measure_12); and determining the relative distance information (d31) from the third terminal to the first terminal according to the another first positioning measurement value (Measure_31) and the third positioning measurement value (Measure_13).

Optionally, corresponding to the UE2 in CASE3 (also applicable to the UE3 in CASE3, where the first terminal is equivalent to the UE2 in CASE3, the second terminal is equivalent to the UE1 in CASE3, and the third terminal is equivalent to the UE3), a third positioning measurement value (Measure_31) for the third terminal measured by the second terminal is also received when the second positioning measurement value (Measure_21) is received; where the second terminal establishes a sidelink with each of the first terminal and the third terminal, and no sidelink is established between the first terminal and the third terminal.

For example, the V-UE2 receives the positioning measurement value Measure_21 of the V-UE1 for the V-UE2 and the positioning measurement value Measure_31 of the V-UE1 for the V-UE3 that are measured by the V-UE1 and forwarded by the BS through the Uu link.

The method further includes: receiving a positioning measurement value (Measure_13) for the second terminal measured by the third terminal and forwarded by a base station; for example, receiving a positioning measurement value Measure_13 of the V-UE3 for the V-UE1 measured by the V-UE3 and forwarded by the BS through the Uu link; determining the relative distance information (d21) from the second terminal to the first terminal according to the first positioning measurement value (Measure_12) and the second positioning measurement value; determining the relative distance information (d31) from the third terminal to the second terminal according to the third positioning measurement value and the positioning measurement value for the second terminal measured by the third terminal; determining the relative distance information (d23) from the first terminal to the third terminal according to the relative distance information from the second terminal to the first terminal and the relative distance information from the third terminal to the second terminal.

For example, the V-UE2 jointly calculates the relative distance information d21 from the V-UE1 to the V-UE2 according to the positioning measurement value Measure_12 calculated by the V-UE2 and the positioning measurement value Measure_21 forwarded by the BS; the V-UE2 jointly calculates the relative distance information d31 from the V-UE3 to the V-UE1 according to the positioning measurement value Measure_31 of the V-UE1 for the V-UE3 and the positioning measurement value Measure_13 of the V-UE3 for the V-UE1 forwarded by the BS; according to the above information d21 and d31, the relative distance information from the V-UE2 to the V-UE3 is jointly calculated as d23=d21+d31.

Optionally, the resource configuration information of the first SPRS, second SPRS, third SPRS, first SRS and second SRS is obtained from a serving base station through signaling.

Optionally, the signaling is broadcast signaling, DCI signaling or positioning dedicated signaling of an air interface radio link, or positioning dedicated signaling of a sidelink.

Figure 7:
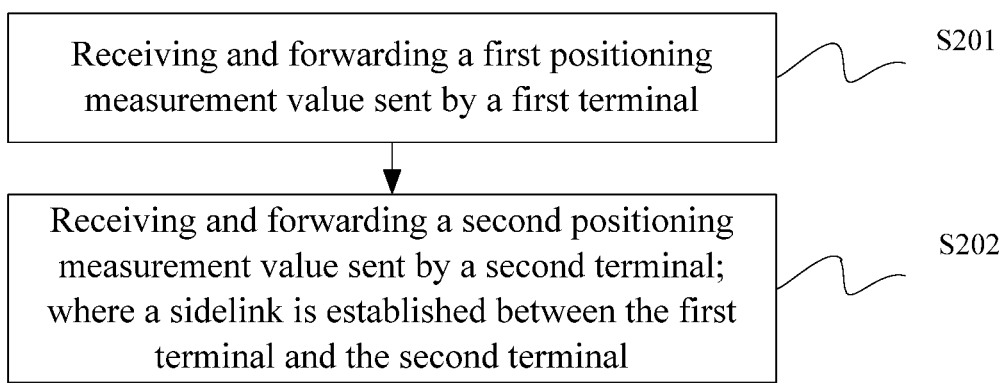
FIG. 7 is a schematic flowchart of a signal communication method on the base station side according to an embodiment of the disclosure.

Correspondingly, on the base station side, referring to FIG. 7, a signal communication method provided in an embodiment of the disclosure includes following steps.

S201: receiving and forwarding a first positioning measurement value sent by a first terminal.

S202: receiving and forwarding a second positioning measurement value sent by a second terminal; where a sidelink is established between the first terminal and the second terminal.

It should be noted that there is no restriction on the sequence between step S201 and step S202.

Optionally, for CASE1, the first positioning measurement value is forwarded to the second terminal, and the second positioning measurement value is forwarded to the first terminal; or, for CASE2, the method further includes: receiving an SRS sent by the first terminal and the second terminal, and determining a positioning measurement value on a base station side by measuring the SRS; forwarding the positioning measurement value on the base station side, the first positioning measurement value and the second positioning measurement value to an LMF entity.

Optionally, for CASE3, the first positioning measurement value (Measure_21) is forwarded to the second terminal and a third terminal, and the second positioning measurement value (Measure_12) is forwarded to the first terminal and the third terminal; where the first terminal establishes a sidelink with each of the third terminal and the second terminal, and no sidelink is established between the third terminal and the second terminal.

Optionally, the method further includes: receiving positioning measurement values (Measure_21 and Measure_31) respectively for the second terminal and the third terminal reported by the first terminal, and forwarding the positioning measurement values to the third terminal and the second terminal.

Optionally, the method further includes: sending resource configuration information of a first SPRS sent by the first terminal to the second terminal on a sidelink and resource configuration information of a second SPRS sent by the second terminal to the first terminal on the sidelink to the first terminal and the second terminal respectively through signaling.

Optionally, the signaling is broadcast signaling, DCI signaling or positioning dedicated signaling of an air interface radio link, or positioning dedicated signaling of a sidelink.

Figure 8:
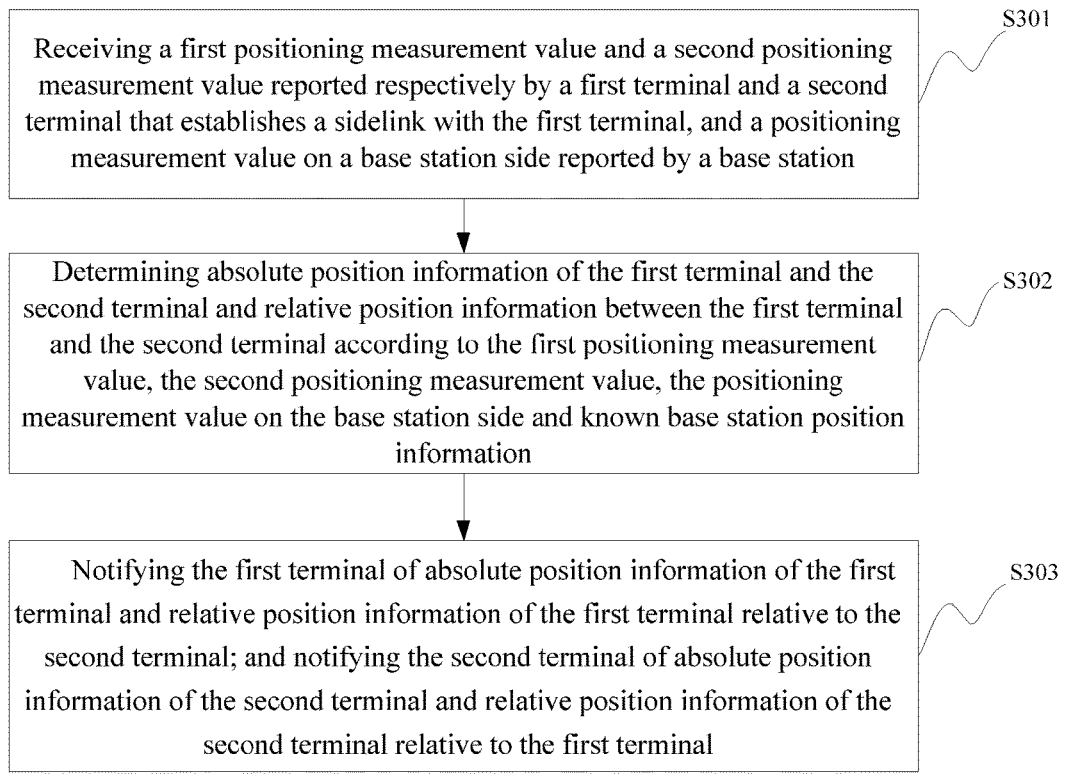
FIG. 8 is a schematic flowchart of a signal communication method on the LMF side according to an embodiment of the disclosure.

Correspondingly, on the LMF entity side (corresponding to the above CASE2), referring to FIG. 8, a signal communication method provided in an embodiment of the disclosure includes following steps.

S301: receiving a first positioning measurement value (positioning measurement value 1) and a second positioning measurement value (positioning measurement value 2) reported respectively by a first terminal and a second terminal that establishes a sidelink with the first terminal, and a positioning measurement value on a base station side reported by a base station.

S302: determining absolute position information of the first terminal and the second terminal and relative position information between the first terminal and the second terminal according to the first positioning measurement value, the second positioning measurement value, the positioning measurement value on the base station side and known base station position information.

S303: notifying the first terminal of absolute position information of the first terminal and relative position information of the first terminal relative to the second terminal; and notifying the second terminal of absolute position information of the second terminal and relative position information of the second terminal relative to the first terminal.

Optionally, the method further includes: sending resource configuration information of a first SRS and resource configuration information of a second SRS to the first terminal and the second terminal respectively through signaling.

Optionally, the signaling is broadcast signaling, DCI signaling or positioning dedicated signaling of an air interface radio link, or positioning dedicated signaling of a sidelink.

Figure 9:
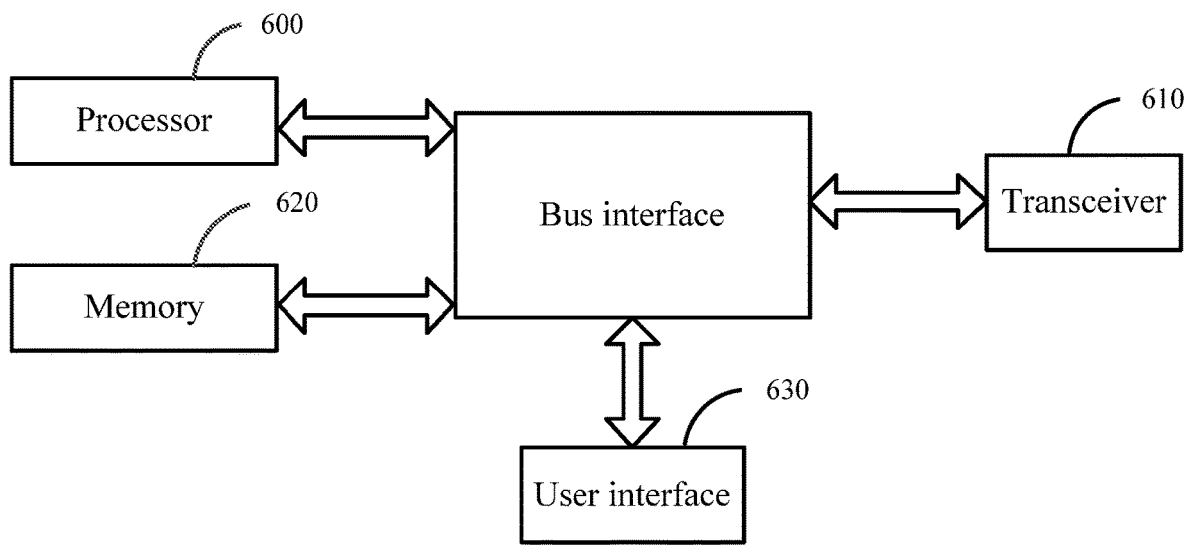
FIG. 9 is a structural schematic diagram of a signal communication device on the terminal side according to an embodiment of the disclosure.

Referring to FIG. 9, on the terminal side, a signal communication device provided in an embodiment of the disclosure includes: a memory 620 configured to store program instructions; a processor 600 configured to invoke the program instructions stored in the memory 620, and execute according to an obtained program: sending a first SPRS to a second terminal through a sidelink between a first terminal and the second terminal, and receiving a second SPRS sent by the second terminal; performing a positioning measurement based on the second SPRS to obtain a first positioning measurement value; reporting the first positioning measurement value to a network side; and receiving a second positioning measurement value forwarded by the network side, where the second positioning measurement value is obtained by the second terminal performing a positioning measurement based on the first SPRS.

Optionally, the processor 600 is further configured to: determine relative distance information from the second terminal to the first terminal according to the first positioning measurement value and the second positioning measurement value.

Optionally, the processor 600 is further configured to: send a first SRS to a base station for the base station to determine a positioning measurement value on a base station side according to the first SRS and a second SRS sent by the second terminal.

Optionally, the processor 600 is further configured to: receive relative position information of the first terminal relative to the second terminal and absolute position information of the first terminal sent by an LMF entity.

Optionally, the processor 600 is further configured to: send the first SPRS to a third terminal through a sidelink between the first terminal and the third terminal, and receive a third SPRS sent by the third terminal; perform a positioning measurement based on the third SPRS to obtain another first positioning measurement value; report the another first positioning measurement value to the network side; and receive a third positioning measurement value forwarded by the network side, where the third positioning measurement value is obtained by the third terminal performing a positioning measurement based on the first SPRS.

Optionally, the processor 600 is further configured to: determine relative distance information from the second terminal to the first terminal according to the first positioning measurement value and the second positioning measurement value; and determine relative distance information from the third terminal to the first terminal according to the another first positioning measurement value and the third positioning measurement value.

Optionally, the processor 600 also receives a third positioning measurement value for a third terminal measured by the second terminal when receiving the second positioning measurement value; the processor 600 is further configured to: receive a positioning measurement value for the second terminal measured by the third terminal and forwarded by a base station; determine relative distance information from the second terminal to the first terminal according to the first positioning measurement value and the second positioning measurement value; determine relative distance information from the third terminal to the second terminal according to the third positioning measurement value and the positioning measurement value for the second terminal measured by the third terminal; determine relative distance information from the first terminal to the third terminal according to the relative distance information from the second terminal to the first terminal and the relative distance information from the third terminal to the second terminal.

Optionally, the processor 600 obtains resource configuration information of the first SPRS, second SPRS, third SPRS, first SRS and second SRS from a serving base station through signaling.

Optionally, the signaling is broadcast signaling, DCI signaling or positioning dedicated signaling of an air interface radio link, or positioning dedicated signaling of a sidelink.

A transceiver 610 is configured to receive and send data under control of the processor 600.

Here, in FIG. 9, the bus architecture may include any numbers of interconnected buses and bridges, and link various circuits of one or more processors represented by the processor 600 and the memory represented by the memory 620. The bus architecture may further link various other circuits such as a peripheral device, a voltage regulator and a power management circuit, which are all well known in the art and thus will not be further described again herein. The bus interface provides an interface. The transceiver 610 may be a plurality of elements, i.e., include a transmitter and a receiver, and provide units for communicating with various other devices over the communication media. For different user equipments, the user interface 630 may also be the interface capable of inter-connecting or exter-connecting with required devices, and the connected devices include but not limited to a keypad, a display, a loudspeaker, a microphone, a joystick and the like.

The processor 600 is responsible for managing the bus architecture and general processing, and the memory 620 may store the data used by the processor 600 when performing the operations.

Optionally, the processor 600 may be Central Processing Unit (CPU), Application Specific Integrated Circuit (ASIC), Field-Programmable Gate Array (FPGA) or Complex Programmable Logic Device (CPLD).

Figure 10:
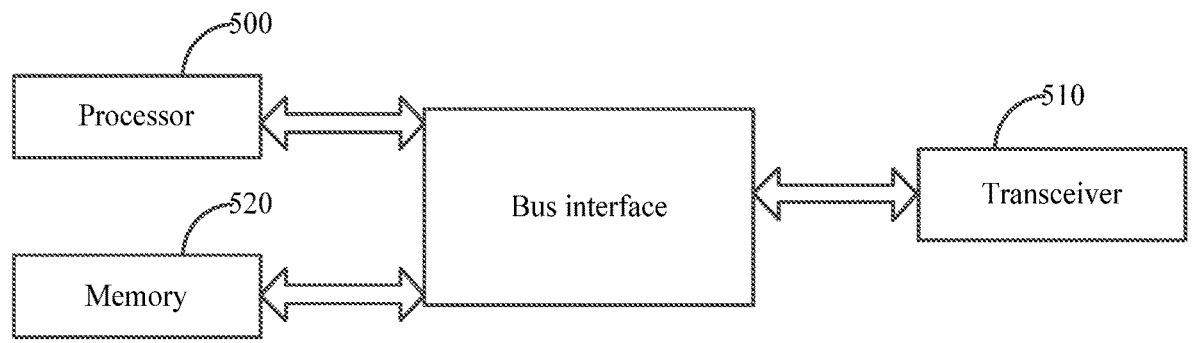
FIG. 10 is a structural schematic diagram of a signal communication device on the base station side according to an embodiment of the disclosure.

Referring to FIG. 10, on the base station side, a signal communication device provided in an embodiment of the disclosure includes: a memory 520 configured to store program instructions; a processor 500 configured to invoke the program instructions stored in the memory, and execute according to an obtained program: receiving and forwarding a first positioning measurement value sent by a first terminal; and receiving and forwarding a second positioning measurement value sent by a second terminal; where a sidelink is established between the first terminal and the second terminal.

Optionally, the processor 500 forwards the first positioning measurement value to the second terminal, and forwards the second positioning measurement value to the first terminal; or, the processor 500 is further configured to: receive an SRS sent by the first terminal and the second terminal, and determine a positioning measurement value on a base station side by measuring the SRS; the processor forwards the positioning measurement value on the base station side, the first positioning measurement value and the second positioning measurement value to an LMF entity.

Optionally, the processor 500 forwards the first positioning measurement value to the second terminal and a third terminal, and forwards the second positioning measurement value to the first terminal and the third terminal; where the first terminal establishes a sidelink with each of the third terminal and the second terminal, and no sidelink is established between the third terminal and the second terminal.

Optionally, the processor 500 is further configured to: receive positioning measurement values respectively for the third terminal and the second terminal reported by the first terminal, and forward the positioning measurement values to the third terminal and the second terminal.

Optionally, the processor 500 is further configured to: send resource configuration information of a first SPRS sent by the first terminal to the second terminal on a sidelink and resource configuration information of a second SPRS sent by the second terminal to the first terminal on the sidelink to the first terminal and the second terminal respectively through signaling.

Optionally, the signaling is broadcast signaling, DCI signaling or positioning dedicated signaling of an air interface radio link, or positioning dedicated signaling of a sidelink.

A transceiver 510 is configured to receive and send data under control of the processor 500.

Here, in FIG. 10, the bus architecture can include any numbers of interconnected buses and bridges, and link various circuits of one or more processors represented by the processor 500 and the memory represented by the memory 520. The bus architecture may further link various other circuits such as a peripheral device, a voltage regulator and a power management circuit, which are all well known in the art and thus will not be further described again herein. The bus interface provides an interface. The transceiver 510 may be a plurality of elements, i.e., include a transmitter and a receiver, and provide units for communicating with various other devices over the communication media. The processor 500 is responsible for managing the bus architecture and general processing, and the memory 520 may store the data used by the processor 500 when performing the operations.

The processor 500 may be CPU, ASIC, FPGA or CPLD.

Figure 11:
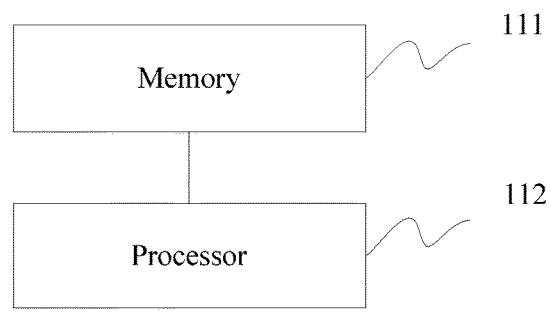
FIG. 11 is a structural schematic diagram of a signal communication device on the LMF side according to an embodiment of the disclosure.

On the LMF side, referring to FIG. 11, a signal communication device provided in an embodiment of the disclosure includes: a memory 111 configured to store program instructions; a processor 112 configured to invoke the program instructions stored in the memory, and execute according to an obtained program: receiving a first positioning measurement value and a second positioning measurement value reported respectively by a first terminal and a second terminal that establishes a sidelink with the first terminal, and a positioning measurement value on a base station side reported by a base station; determining absolute position information of the first terminal and the second terminal and relative position information between the first terminal and the second terminal according to the first positioning measurement value, the second positioning measurement value, the positioning measurement value on the base station side and known base station position information; notifying the first terminal of absolute position information of the first terminal and relative position information of the first terminal relative to the second terminal; and notifying the second terminal of absolute position information of the second terminal and relative position information of the second terminal relative to the first terminal.

Optionally, the processor 112 is further configured to: send resource configuration information of a first SRS and resource configuration information of a second SRS to the first terminal and the second terminal respectively through signaling.

Optionally, the signaling is broadcast signaling, DCI signaling or positioning dedicated signaling of an air interface radio link, or positioning dedicated signaling of a sidelink.

Figure 12:
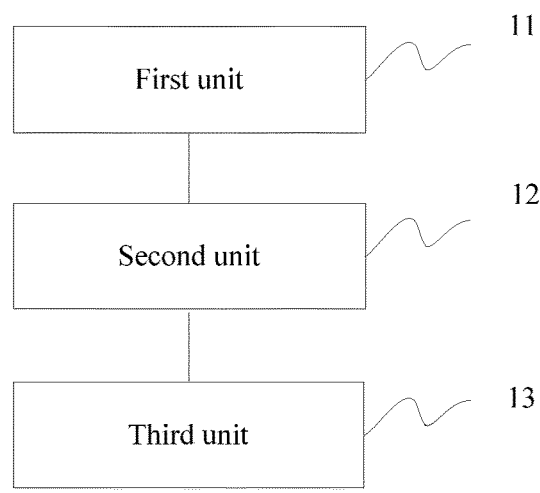
FIG. 12 is a structural schematic diagram of another signal communication device on the terminal side according to an embodiment of the disclosure.

Referring to FIG. 12, on the terminal side, another signal communication device provided in an embodiment of the disclosure includes: a first unit 11 configured to send a first SPRS to a second terminal through a sidelink between a first terminal and the second terminal, and receive a second SPRS sent by the second terminal; a second unit 12 configured to perform a positioning measurement based on the second SPRS to obtain a first positioning measurement value; a third unit 13 configured to report the first positioning measurement value to a network side; and receive a second positioning measurement value forwarded by the network side, where the second positioning measurement value is obtained by the second terminal performing a positioning measurement based on the first SPRS.

Figure 13:
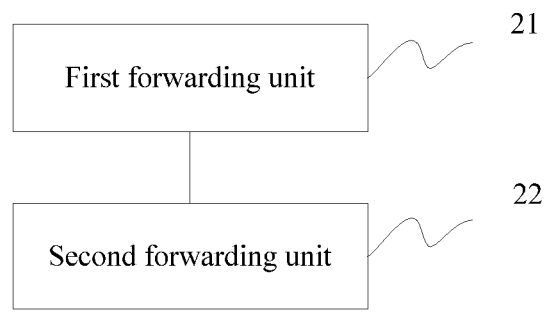
FIG. 13 is a structural schematic diagram of another signal communication device on the base station side according to an embodiment of the disclosure.

Referring to FIG. 13, on the base station side, another signal communication device provided in an embodiment of the disclosure includes: a first forwarding unit 21 configured to receive and forward a first positioning measurement value sent by a first terminal; and a second forwarding unit 22 configured to receive and forward a second positioning measurement value sent by a second terminal; where a sidelink is established between the first terminal and the second terminal.

Figure 14:
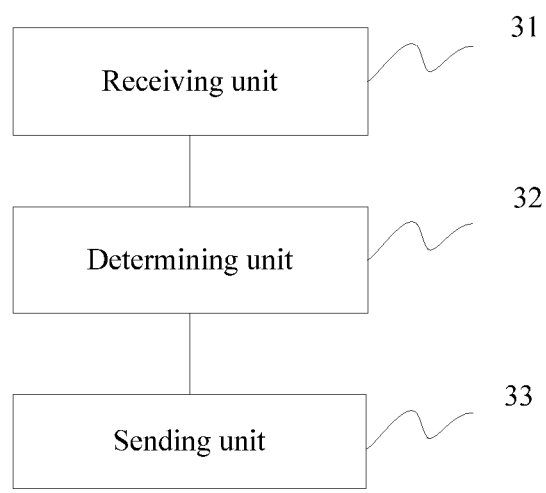
FIG. 14 is a structural schematic diagram of another signal communication device on the LMF side according to an embodiment of the disclosure.

Referring to FIG. 14, on the LMF entity side, another signal communication device provided in an embodiment of the disclosure includes: a receiving unit 31 configured to receive a first positioning measurement value and a second positioning measurement value reported respectively by a first terminal and a second terminal that establishes a sidelink with the first terminal, and a positioning measurement value on a base station side reported by a base station; a determining unit 32 configured to determine absolute position information of the first terminal and the second terminal and relative position information between the first terminal and the second terminal according to the first positioning measurement value, the second positioning measurement value, the positioning measurement value on the base station side and known base station position information; a sending unit 33 configured to notify the first terminal of absolute position information of the first terminal and relative position information of the first terminal relative to the second terminal; and notify the second terminal of absolute position information of the second terminal and relative position information of the second terminal relative to the first terminal.

It should be noted that the division of units in embodiments of the disclosure is illustrative, and is merely a kind of logical function division, and there may be other division methods in actual implementations. In addition, the functional units in each embodiment of the disclosure may be integrated into one processing unit, or each unit may exist alone physically, or two or more units may be integrated into one unit. The above-mentioned integrated units may be implemented in the form of hardware, or may be implemented in the form of software functional units.

When the integrated unit is implemented in the form of software functional unit and sold or used as an independent product, it may be stored in a computer readable storage medium. Based on such understanding, the technical solution of the disclosure essentially or a part that contributes to the prior art or all or a part of the technical solution may be embodied in the form of software product. The computer software product is stored in a storage medium, and includes several instructions used to enable a computer device (which may be a personal computer, a server, or a network device, etc.) or a processor to perform all or some of the steps of the methods of various embodiments of the disclosure. The above-mentioned storage medium includes: USB flash drive, mobile hard disk, Read-Only Memory (ROM), Random Access Memory (RAM), magnetic disk or compact disc or various media that can store the program codes.

An embodiment of the disclosure provides a computing device, which may be a desktop computer, a portable computer, a smart phone, a tablet computer, a Personal Digital Assistant (PDA), etc. The computing device may include a Center Processing Unit (CPU), a memory, input/output devices and the like. The input device may include a keyboard, a mouse, a touch screen and the like, and the output device may include a display device such as Liquid Crystal Display (LCD), Cathode Ray Tube (CRT) or the like.

The memory may include a Read-Only Memory (ROM) and a Random Access Memory (RAM), and provide the program instructions and data stored in the memory to the processor. In an embodiment of the disclosure, the memory may be used to store the program of any one of the methods provided by embodiments of the disclosure.

The processor invokes the program instructions stored in the memory and is configured to perform any one of the methods provided by embodiments of the disclosure in accordance with the obtained program instructions.

An embodiment of the disclosure provides a computer storage medium for storing the computer program instructions used by the devices provided by embodiments of the disclosure described above, where the computer storage medium contains the program for performing any one of the methods provided by embodiments of the disclosure described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by embodiments of the disclosure may be applied to the terminal devices, and may also be applied to the network devices.

Here, the terminal device may also be referred to as the User Equipment ("UE" for short), Mobile Station ("MS" for short), Mobile Terminal ("MT" for short) or the like. Optionally, the terminal may has the ability of communicating with one or more core networks via the Radio Access Network (RAN). For example, the terminal may be a mobile telephone (or called "cellular" telephone), or a computer with the mobile property. For example, the terminal can also be a portable, pocket, handheld, computer built-in or vehicle-carried mobile device.

The network device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, where the rest of the access network may include Internet Protocol (IP) networks. The base station may further coordinate the attribute management of the air interface. For example, the base station may be the BTS in the GSM or CDMA, or may be the NodeB in the WCDMA, or may be the NodeB or eNB or e-NodeB (evolutional Node B) in the LTE, or may be the gNB in the 5G system, or the like. which is not limited in embodiments of the disclosure.

The processing flows of the above methods may be implemented by a software program, which may be stored in a storage medium. When the stored software program is invoked, the above method steps are performed.

It should be understood by those skilled in the art that embodiments of the disclosure may be provided as methods, systems and computer program products. Thus the disclosure can take the form of hardware embodiments alone, software embodiments alone, or embodiments combining the software and hardware aspects. Also the disclosure may take the form of computer program products implemented on one or more computer usable storage mediums (including but not limited to magnetic disk memories, optical memories and the like) containing computer usable program codes therein.

The disclosure is described by reference to the flow charts and/or the block diagrams of the methods, the devices (systems) and the computer program products according to embodiments of the disclosure. It should be understood that each process and/or block in the flow charts and/or the block diagrams, and a combination of processes and/or blocks in the flow charts and/or the block diagrams may be implemented by the computer program instructions. These computer program instructions may be provided to a general-purpose computer, a dedicated computer, an embedded processor, or a processor of another programmable data processing device to produce a machine, so that a device for implementing the functions specified in one or more processes of the flow charts and/or one or more blocks of the block diagrams is produced by the instructions executed by the computer or the processor of another programmable data processing device.

These computer program instructions may also be stored in a computer readable memory which is capable of guiding the computer or another programmable data processing device to operate in a particular way, so that the instructions stored in the computer readable memory produce a manufacture including an instruction device which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Evidently those skilled in the art can make various modifications and variations to the disclosure without departing from the spirit and scope of the disclosure. Thus the disclosure is also intended to encompass these modifications and variations to the disclosure as long as these modifications and variations come into the scope of the claims of the disclosure and their equivalents.

What is claimed is:

1. A signal communication method, the method comprising:

sending a first Sidelink Positioning Reference Signal, SPRS, to a second terminal through a sidelink between a first terminal and the second terminal, and receiving a second SPRS sent by the second terminal;

performing a positioning measurement based on the second SPRS to obtain a first positioning measurement value;

reporting the first positioning measurement value to a network side; and receiving a second positioning measurement value forwarded by the network side, wherein the second positioning measurement value is obtained by the second terminal performing a positioning measurement based on the first SPRS;

the method further comprising:

sending the first SPRS to a third terminal through a sidelink between the first terminal and the third terminal, and receiving a third SPRS sent by the third terminal;

performing a positioning measurement based on the third SPRS to obtain another first positioning measurement value;

reporting the another first positioning measurement value to the network side; and receiving a third positioning measurement value forwarded by the network side, wherein the third positioning measurement value is obtained by the third terminal performing a positioning measurement based on the first SPRS;

determining relative distance information from the second terminal to the first terminal according to the first positioning measurement value and the second positioning measurement value; and determining relative distance information from the third terminal to the first terminal according to the another first positioning measurement value and the third positioning measurement value;

or
- wherein a third positioning measurement value for the third terminal measured by the second terminal is also received when the second positioning measurement value is received; and the method further comprises:
- receiving a positioning measurement value for the second terminal measured by the third terminal and forwarded by a base station;
- determining relative distance information from the second terminal to the first terminal according to the first positioning measurement value and the second positioning measurement value;
- determining relative distance information from the third terminal to the second terminal according to the third positioning measurement value and the positioning measurement value for the second terminal measured by the third terminal;
- determining relative distance information from the first terminal to the third terminal according to the relative distance information from the second terminal to the first terminal and the relative distance information from the third terminal to the second terminal.

2. The method according to claim 1, the method further comprising:
- determining relative distance information from the second terminal to the first terminal according to the first positioning measurement value and the second positioning measurement value.

3. The method according to claim 1, the method further comprising:
- sending a first Sounding Reference Signal, SRS, to a base station for the base station to determine a positioning measurement value on the base station side according to the first SRS and a second SRS sent by the second terminal.

4. The method according to claim 3, the method further comprising:
- receiving relative position information of the first terminal relative to the second terminal and absolute position information of the first terminal sent by a Location Management Function, LMF, entity.

5. The method according to claim 3, wherein resource configuration information of the first SPRS, second SPRS, third SPRS, first SRS and second SRS is obtained from a serving base station through signaling;
- wherein the signaling is broadcast signaling, Downlink Control Information, DCI, signaling or positioning dedicated signaling of an air interface radio link, or positioning dedicated signaling of a sidelink.

6. A signal communication method, the method comprising:
- receiving and forwarding a first positioning measurement value sent by a first terminal; and
- receiving and forwarding a second positioning measurement value sent by a second terminal; wherein a sidelink is established between the first terminal and the second terminal;
- wherein the first positioning measurement value is forwarded to the second terminal and a third terminal, and the second positioning measurement value is forwarded to the first terminal and the third terminal; wherein the first terminal establishes a sidelink with each of the third terminal and the second terminal, and no sidelink is established between the third terminal and the second terminal;

the method further comprising:
- receiving positioning measurement values respectively for the third terminal and the second terminal reported by the first terminal, and forwarding the positioning measurement values to the third terminal and the second terminal.

7. The method according to claim 6, wherein
the method further comprises: receiving a Sounding Reference Signal, SRS, sent by the first terminal and the second terminal, and determining a positioning measurement value on a base station side by measuring the SRS;
- reporting the positioning measurement value on the base station side, the first positioning measurement value and the second positioning measurement value to a Location Management Function, LMF, entity.

8. The method according to claim 6, the method further comprising:
- sending resource configuration information of a first Sidelink Positioning Reference Signal, SPRS, sent by the first terminal to the second terminal on a sidelink and resource configuration information of a second SPRS sent by the second terminal to the first terminal on the sidelink to the first terminal and the second terminal respectively through signaling;
- wherein the signaling is broadcast signaling, Downlink Control Information, DCI, signaling or positioning dedicated signaling of an air interface radio link, or positioning dedicated signaling of a sidelink.

9. A signal communication method, the method comprising:
- receiving a first positioning measurement value and a second positioning measurement value reported respectively by a first terminal and a second terminal that establishes a sidelink with the first terminal, and a positioning measurement value on a base station side reported by a base station;
- determining absolute position information of the first terminal and the second terminal and relative position information between the first terminal and the second terminal according to the first positioning measurement value, the second positioning measurement value, the positioning measurement value on the base station side and known base station position information;
- notifying the first terminal of absolute position information of the first terminal and relative position information of the first terminal relative to the second terminal; and notifying the second terminal of absolute position information of the second terminal and relative position information of the second terminal relative to the first terminal.

10. The method according to claim 9, the method further comprising:
- sending resource configuration information of a first Sounding Reference Signal, SRS, and resource configuration information of a second SRS to the first terminal and the second terminal respectively through signaling;
- wherein the signaling is broadcast signaling, Downlink Control Information, DCI, signaling or positioning dedicated signaling of an air interface radio link, or positioning dedicated signaling of a sidelink.

* * * * *